F. H. DAVIS.
ENVELOP FASTENER.
APPLICATION FILED NOV. 6, 1913.

1,093,572.

Patented Apr. 14, 1914.

Witnesses
A. B. Decker
F. Lief Jones

Inventor
Frederick H. Davis
By Gilbert H. Decker
Attorney

UNITED STATES PATENT OFFICE.

FREDERICK H. DAVIS, OF SYRACUSE, NEW YORK, ASSIGNOR TO THE NATIONAL BOOK COVER COMPANY, OF SYRACUSE, NEW YORK, A CORPORATION OF NEW YORK.

ENVELOP-FASTENER.

1,093,572. Specification of Letters Patent. Patented Apr. 14, 1914.

Application filed November 6, 1913. Serial No. 799,634.

*To all whom it may concern:*

Be it known that I, FREDERICK H. DAVIS, citizen of the United States, residing at Syracuse, in the county of Onondaga and State of New York, have invented certain new and useful Improvements in Envelop-Fasteners, of which the following is a specification.

This invention relates primarily to envelop fasteners. Its purpose is to provide a fastener which when attached to an envelop will possess the characteristics: first, of a positive lock—one which can be easily locked, opened and relocked, thus meeting the requirements of the Postmaster General respecting unsealed packages: and second, of ease in manipulation in that it may be more quickly and readily locked and unlocked than most of such fasteners heretofore devised.

The invention therefore consists in the construction of the improved envelop fastener and in the arrangement and association of features constituting the same substantially as hereinafter set forth and claimed.

Figure 1:
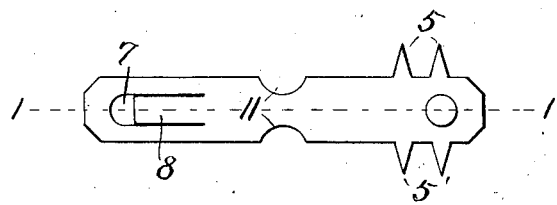
Figure 2:
Figure 3:
Figure 4:
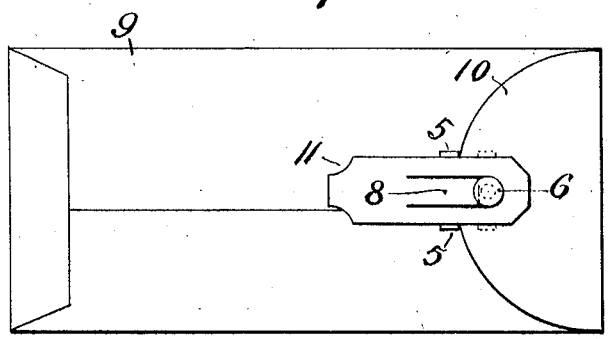

In the accompanying drawing which forms a part of this specification, Figure 1 represents in plan the improved fastener as it comes from the dies; Fig. 2 is a longitudinal medial section, on the line 1—1, Fig. 1, with the attaching points or prongs turned down; Fig. 3 is a side elevation of the fastener as applied and locked; and Fig. 4 is a plan of an envelop equipped with the fastener which is shown in locked position.

The fastener is preferably made of a single piece of flexible material such as a strip of thin metal having one part of the locking device upon a portion which shall readily coact with the complementary part upon the other portion of the fastener.

The drawings show the preferred form wherein one end portion of the body of the fastener is provided with prongs 5 for securing it to the envelop to be locked. This end is also provided with a headed post 6 preferably struck up from the metal of the body. The other end portion of the body is provided with an aperture 7 of the same transverse diameter as said head but with a longitudinal diameter somewhat less than the diameter of the head. The longitudinal diameter of the hole 7 is shortened by a tongue 8 protruding into the hole. This tongue is preferably formed in the body of the fastener by longitudinal, parallel slits tangential to the hole 7, which is shown as a segment of a circle.

The fastener is applied to an envelop, such as 9, by passing the prongs 5 through one side thereof and clenching them. When the envelop is to be closed and locked the flap 10 thereof is placed over the post 6 and the free end of the fastener is bent over and pressed down, the post passing through the hole 7. In this act the tongue snaps by the head of the post, the neck of which is then between the end of the tongue and the opposite side of the hole. In unlocking the fastener, the tongue snaps by the head of the post and again resumes the plane of its portion of the fastener, the material of the fastener being of sufficient resiliency to permit the tongue to do so.

To provide for ready bending of the single-strip fastener the body thereof may be weakened near its middle as by cutting away the material at opposite sides as indicated at 11.

The invention claimed is:

An article of manufacture—an envelop fastener—consisting of a strip of flexible material one end portion of which is provided with means for securing it to an envelop and also with a headed post while the other end portion of said strip is provided with an aperture of the same transverse diameter as the head of said post and with a resilient tongue extending longitudinally of said strip and formed by cutting parallel slits in said strip tangential to said aperture, the free end of said tongue protruding slightly into said aperture thereby reducing the diameter of said aperture extending longitudinally of the strip, for the purpose set forth, said strip being adapted for folding whereby one end portion may be superimposed upon the other so that said headed post may enter said aperture.

In testimony whereof I have affixed my signature in presence of two witnesses.

FREDERICK H. DAVIS.

Witnesses:
 FRANK H. DECKER,
 JACOB G. SMITH.

---

Copies of this patent may be obtained for five cents each, by addressing the "Commissioner of Patents, Washington, D. C."